United States Patent [19]
Rinard

[11] Patent Number: 5,252,786
[45] Date of Patent: Oct. 12, 1993

[54] MULTI-FUNCTION EARTHQUAKE ALERTING APPARATUS

[76] Inventor: Ernest W. Rinard, 5199 Pacific Coast Hwy., No. 332N, Long Beach, Calif. 90804

[21] Appl. No.: 965,765

[22] Filed: Oct. 23, 1992

[51] Int. Cl.⁵ ............................................. G01V 1/16
[52] U.S. Cl. .................................... 181/122; 33/330; 73/652
[58] Field of Search ................... 181/122, 401; 33/330; 73/594, 649, 652, 784

[56] References Cited

U.S. PATENT DOCUMENTS

| | | |
|---|---|---|
| 4,359,722 | 11/1982 | Valdez et al. ........................ 340/540 |
| 4,484,186 | 11/1984 | Wood et al. .......................... 340/689 |
| 5,001,466 | 3/1991 | Orlinsky et al. ..................... 340/690 |

Primary Examiner—J. Woodrow Eldred
Attorney, Agent, or Firm—Thomas I. Rozsa; Dong Chen

[57] ABSTRACT

The present invention is a multi-function earthquake alerting apparatus. It is designed and built as an average household item with simple and durable mechanical parts. It can serve as a decorative item. However, when an earthquake happens, it will serve as an information center in a quick glance. The essential functions of the present invention earthquake alerting apparatus include indicating the direction of the epicenter of a major earthquake, providing an auditory alert for small warning shocks and after shocks, and providing information on the exact time of the earthquake.

24 Claims, 1 Drawing Sheet

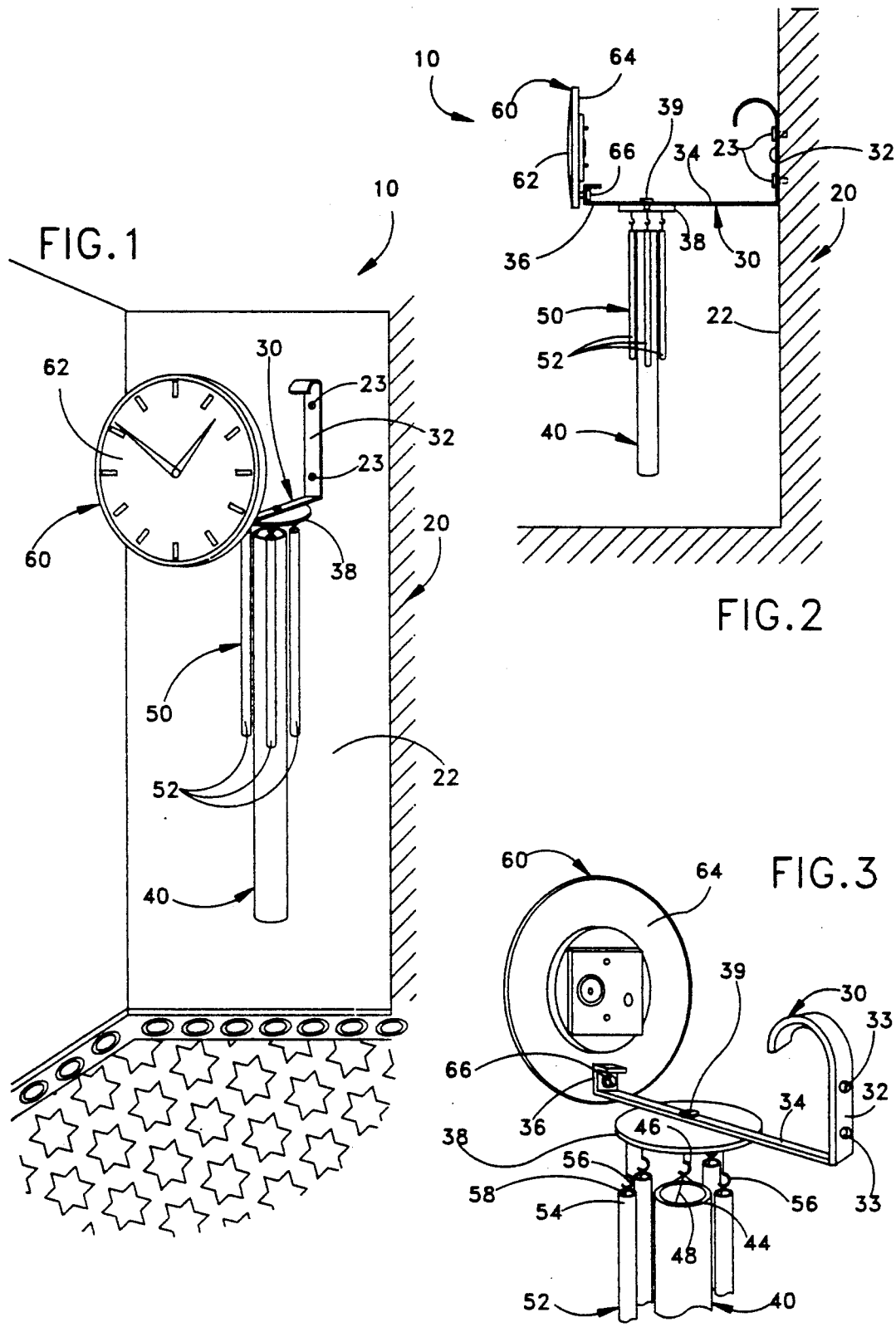

MULTI-FUNCTION EARTHQUAKE ALERTING APPARATUS

BACKGROUND OF THE INVENTION

1. Field of The Invention

The present invention relates to the field of simple mechanical alerting apparatus. More particularly, the present invention relates to the field of simple mechanical alerting apparatus to provide information at the time of an earthquake.

2. Description of The Prior Art

In some areas of the United States, such as California, earthquakes are not only serious threats but also real causes of massive loss and destruction of human lives and properties. To the general public living in such areas, there are many earthquake related questions which need to be answered. For example, before an earthquake happens, one wants to know when it will happen. When an earthquake does happen, one wants to known the time of the earthquake and the direction of the epicenter. After a major earthquake, one wants to know the frequency of the small after shocks.

Unfortunately, not all the questions can be answered with precision. For example, modern science and technology are still unable to predict with certainty when an earthquake will happen. However, some major earthquakes are often accompanied by many small warning shocks. Frequently, after a strong earthquake, many small aftershocks will follow. Therefore, if one can be alerted by the small warning shocks, then extra precautions may be taken to prepare and protect life and property.

Timepieces such as clocks and watches are known in the art. However, not all timepieces maintain their proper functions when an earthquake happens. For example, many modern timepieces are energized by electric power. When a major earthquake happens, it is likely that the power will be cut off, thus an electric timepiece will not function. Other timepieces may be knocked off the wall or shelf or cannot be located in a hurry. In addition, when an earthquake happens, one only has time to take a quick glance and some timepieces are not large enough for such purposes.

There is also no simple and inexpensive apparatus on today's market which is designed and built for average households to provide an auditory alert for small warning shocks or aftershocks and to indicate the epicenter when a major earthquake happens. It is very desirable, particularly in the areas where the risk of having strong earthquakes is high, to have a multi-function earthquake alerting apparatus which can provide an auditory alert for small warning shocks and aftershocks, inform someone of the exact time of an earthquake, and indicate the direction of epicenter of a major earthquake.

SUMMARY OF THE INVENTION

The present invention is a multi-function earthquake alerting apparatus. It is designed and built as an average household item with simple and durable mechanical parts. It can serve as a decorative item. However, when an earthquake happens, it will serve as an information center to provide detailed information such as an auditory alarm for the occurrence of the earthquake, the time of the earthquake, and the direction of the epicenter.

The present invention multi-function earthquake alerting apparatus comprises a suspending frame, an epicenter indicator, an auditory alerting device and a timepiece. The multi-function earthquake alerting apparatus can be mounted to an interior wall of one's house. The suspending frame is used for suspending the epicenter indicator and the auditory alerting device. The timepiece is also supported by the suspending frame.

The epicenter indicator of the present invention apparatus is a cylindrical shaped pendulum. The cylindrical pendulum is suspended by the suspending frame in a manner such that it is free to swing. Since the vibrational waves of an earthquake travel outwardly in radial directions from the epicenter, the pendulum will generally swing in a radial direction from the epicenter to the location of the pendulum. Therefore, from the swinging direction of the pendulum, one can tell roughly from where the earthquake is coming.

The auditory alerting device of the present invention apparatus is a set of chimes. The set of chimes are also cylindrical shaped and suspended by the suspending frame. The chimes are symmetrically positioned around and near the pendulum. When an earthquake occurs, the set of chimes will swing and collide respectively with the pendulum to provide an audible alarm for alerting purposes.

The timepiece of the present invention apparatus is a clock. The clock will have a relatively large and illuminated display surface which can be viewed from a distance even in the dark. The clock is preferably operable without electrical power, so that even if the electrical power is disrupted during an earthquake, the clock can still function. If the clock uses household electrical power sources, then it is preferable to equip the clock with a back up battery so that it can continuously function even when the household electrical power is no longer available. More conventionally, the clock or timepiece is battery operated.

The various components of the present invention multi-function earthquake alerting apparatus are all suspended on a suspending frame, which in turn is mounted to an interior wall of one's house. During normal times the earthquake alerting apparatus is displayed as an attractive article which decorates the interior environment of the house. When an earthquake occurs, the vibration and shaking of the ground and the house will be transmitted through the suspending frame to the various components of the earthquake alerting apparatus, which in turn will perform their desired functions.

It is a primary object of the present invention to provide a multi-function earthquake alerting apparatus for average households located in the areas with high risk of earthquakes. The essential functions of the present invention earthquake alerting apparatus will include the function of indicating the direction of epicenter of a major earthquake, the function of providing an auditory signal or alarm for small warning shocks and aftershocks, and the function of providing the exact time of the earthquake. When an earthquake occurs, one can be alerted by the sound of the chimes, and quickly informed about the time and the direction of the epicenter simultaneously by taking a quick glance at the timepiece and the swinging pendulum.

It is also an object of the present invention to provide a multi-function earthquake alerting apparatus that will maintain normal functions and not be disrupted by the breakdown of the electrical power system, which is likely to occur during a major earthquake. The essential components of the present invention earthquake alerting apparatus can function mechanically without electric power and the timepiece can be battery operated. Even in the embodiments where the timepiece uses normal household electric power source in normal situations, a backup battery will be provided to the timepiece for non-interrupted performance.

It is a further object of the present invention to provide a multi-function earthquake alerting apparatus which is simple, durable and inexpensive. The various components of the present invention earthquake alerting apparatus can be manufactured, packaged and transported separately, and later quickly assembled by the user without complicated procedures and heavy equipment. It can be easily installed in one's home without the requirement of any precise calibration.

It is an additional object of the present invention to provide a multi-function earthquake alerting apparatus which is not only very easy to maintain, but also serves as an elegant ornament in one's home. The timepiece, the pendulum and the set of chimes of the present invention earthquake alerting apparatus can be all designed harmoniously to accommodate and enhance the different fashions and styles of the furniture and decorations of one's home.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 1 is a front perspective view of the present invention multi-function earthquake alerting apparatus.

FIG. 2 is a side elevational view of the present invention multi-function earthquake alerting apparatus.

FIG. 3 is a partial perspective rear view of the present invention multi-function earthquake alerting apparatus.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Referring to FIGS. 1 through 3, there is shown at 10 the present invention multi-function earthquake alerting apparatus. The multi-function earthquake alerting apparatus 10 can be mounted to an interior wall 20 of one's house. Preferably it is mounted to a flat surface 22 of the wall 20. The present invention apparatus 10 comprises a suspending frame 30, an epicenter indicating pendulum 40, an auditory alerting chime set 50 and a timepiece 60. The various components of the multi-function earthquake alerting apparatus 10 can be manufactured, packaged and transported separately. Alternatively, the various components of the multi-function earthquake alerting apparatus 10 may be preassembled together. In any event, the multi-function earthquake alerting apparatus 10 can be quickly assembled and installed in one's home with simple tools.

The suspending frame 30 of the present invention multi-function earthquake alerting apparatus 10 is mounted to the surface 22 of wall 20 for suspending the epicenter indicating pendulum 40 and the auditory alerting chime set 50, and supporting the timepiece 60. The suspending frame 30 is preferably made of metal materials such as aluminum or brass. The suspending frame 30 has a vertical portion 32 for attachment to the surface 22 of the wall 20, a transverse portion 34 for suspending the epicenter indicating pendulum 40 and the auditory alerting chime set 50, and an forward end portion 36 for mounting the timepiece 60. The vertical portion 32 may have several apertures 33 for accommodating mounting bolts 23. The transverse portion 34 of the suspending frame 30 has a forward end which is integrally connected to the vertical portion 32 of the suspending frame 30 and a rearward end which is integrally connected to the forward end portion 36 of the suspending frame 30. The transverse portion 34 of the suspending frame 30 also has a widened disc-shaped section 38 between its forward and rearward ends. The disc-shaped section 38 may be a separate piece attached to the transverse portion 34 of the suspending frame 36 by a pin 39. The disc-shaped section 38 has a flat underneath surface for hanging the epicenter indicating pendulum 40 and the auditory alerting chime set 50 in spaced apart relationship. The suspending frame 30 may also be mounted to other interior part of one's house, such as a ceiling of the house.

The epicenter indicating pendulum 40 of the present invention multi-function earthquake alerting apparatus 10 preferably has a cylindrical-shaped configuration. The epicenter indicating pendulum 40 may be made of metal materials such as brass or steel. The cylindrical pendulum 40 is suspended from the center of the underneath surface of the widened disc-shaped section 38 of the transverse portion 34 of the suspending frame 30. The cylindrical pendulum 40 may be suspended by any suitable means which allows the cylindrical pendulum 40 to swing freely. A hook-and-thread combination is shown in the drawings as an example of such suitable means for hanging the cylindrical pendulum 40. The hook-and-thread combination may include a hook 46 and a group of threads 48 hanging on the hook 46 and attaching the upper end 44 of the pendulum 40. When an earthquake happens, its vibrational waves travel outwardly from the epicenter in radial directions. Accordingly, the present invention pendulum 40 will swing generally in such a radial direction from the epicenter to the location of the pendulum 40. From the swinging direction of the pendulum 40, one can observe the general direction of the epicenter.

The auditory alerting chime set 50 of the present invention multi-function earthquake alerting apparatus 10 includes a multiplicity of chimes 52. Preferably each chime 52 also has a cylindrical-shaped configuration. The chimes 52 may be made of metal materials such as brass or steel. The cylindrical chimes 52 are also suspended to the underneath surface of the widened disc-shaped section 38 of the transverse portion 34 of the suspending frame 30, but are symmetrically positioned around and near the pendulum 40. Each chime 52 is individually suspended by a suitable means which allows the respective chime 52 to swing freely. Such a suitable means may again be a hook-and-thread combination similar to the one used for suspending the pendulum 40. The hook-and-thread combination may include a hook 56 and a group of threads 58 hanging on the hook 56 and attaching the upper end 54 of the respective chime 52. When an earthquake occurs, the chimes set 50 will swing and collide respectively with the pendulum 40 to provide an audible alarm for alerting purposes.

The epicenter indicating pendulum 40 and the auditory alerting chime set 50 of the present invention multi-function earthquake alerting apparatus 10 may be made of hollow metal tubes for providing better sound effects. The respective length and sidewall thickness, which is determined by the external and internal diameters of the hollow tubes of the pendulum 40 and chimes 52, can be designed such that their sounds are loud but pleasurable.

The epicenter indicating pendulum 40 and the auditory alerting chime set 50 of the present invention multi-function earthquake alerting apparatus 10 may have other alternative configurations. For example, the chimes 52 may be thin metal plates or small spherical balls. The pendulum 40 may also have a spherical configuration. However, an important consideration is that at least the respective sound producing portion of the pendulum 40 and the chimes 50 must be able to contact each other. For example, if the pendulum 40 is a cylindrical tube and the chimes are spherical balls suspended by respective long threads, then the length of the pendulum tube must be longer than the length of the threads of the chime balls, otherwise the chime balls can never collide with the pendulum tube.

Another consideration in the design and arrangement of the present invention epicenter indicating pendulum 40 and auditory alerting chime set 50 is to make sure that when they are swinging, at least one of the chimes can definitely hit the pendulum. Therefore, it is preferable to have four chimes around the pendulum at four 90 degree spaced apart directions, where the gap between the chimes is narrower than the cross sectional diameter of the pendulum. It is also desirable to make the pendulum cylinder substantially heavier and longer than each chime cylinder, so that upon a same initial impact the initial swing angle of the pendulum is also different than that of the chimes, and the oscillation frequency of the pendulum is also different than that of the chimes. In addition, using lighter and shorter chimes makes them more sensitive to smaller warning shocks and aftershocks.

The timepiece 60 of the present invention multi-function earthquake alerting apparatus 10 is a clock. The clock 60 has a front display surface 62 and a rear mounting surface 64. The front display surface 62 of clock 60 is relatively large so that it can be viewed from a distance. The hour marks and the hour and minute hands of clock 60 may be illuminated with, for example, fluorescent material, so that even in darkness one can tell the time. Of course clock 60 may simply be a conventional clock without illuminating features. The forward end portion 36 of the suspending frame 30 is attached to the rear surface 64 of the clock 60 by, for example, a screw bolt 66. The forward end portion 36 of the suspending frame 30 may have a small aperture for accommodating the screw bolt, and the rear surface 64 of the clock 60 may have a screw bore for receiving the screw bolt. It is understood that other suitable mounting methods, such as using adhesive means, may also be utilized.

The clock 60 is preferably operable without normal household electrical power (i.e. battery operated or mechanical windup), so that when the electrical power is disrupted during an earthquake, the clock 60 can still operate. However, if the clock 60 does use household electrical power sources, then it is preferably equipped with a back up battery, so that it can continuously operate even when the household electrical power is cutoff.

The various components of the present invention multi-function earthquake alerting apparatus 10 are all shaped, colored and decorated in a harmonious manner so that during normal times it can serve as an attractive article which decorates the interior environment of the house. It can be designed and built in various fashions to suit the individual arrangement of one's furniture, floor type or carpet colors, wall paintings or wall papers, etc. For example, the whole unit of the present invention multi-function earthquake alerting apparatus 10 may be designed and made as a highly collectible antique item, or a very attractive contemporary article.

The present invention has many advantageous features, including: (a) it provides a multi-function earthquake alerting apparatus for average households located in the areas with high risk of earthquakes; (b) it provides multiple earthquake survival related functions, such as indicating the direction of epicenter of a major earthquake, providing an auditory alert for small warning shocks and aftershocks, and informing the exact time of the earthquake; and (c) it provides a multi-function earthquake alerting apparatus that can maintain normal functions and not be disrupted by the break down of electrical power system, which often occurs during a major earthquake.

The advantageous features of the present invention also includes: (a) it provides a multi-function earthquake alerting apparatus which is very simple and practical for ordinary household use; (b) it serves not only as a multi-function earthquake alerting apparatus, but also as an elegant ornament in one's home in normal times; and (c) it provides a multi-function earthquake alerting apparatus which is very inexpensive and easy to maintain.

Defined in detail, the present invention is a multi-function earthquake alerting apparatus, comprising: (a) a suspending frame made of metal material having a vertical portion for attachment with an interior wall of one's house, a transverse portion having a forward end and a rearward end which is integrally connected to the vertical portion, and a forward end portion integrally connected to the forward end of the transverse portion; (b) means for mounting said vertical portion of said suspending frame to an elevated position on said interior wall; (c) a hollow cylindrical shaped pendulum made of metal material; (d) a multiplicity of identical hollow cylindrical shaped chimes also made of metal material, the weight and dimensions of each chime being substantially less than the weight and dimensions of said pendulum; (e) said transverse portion of said suspending frame further comprising a widened disc-shaped section between its said forward and rearward ends which has an underneath surface for suspending said pendulum and said chimes; (f) means for suspending said pendulum to the center of said underneath surface of said widened disc-shaped section of said transverse portion of said suspending frame such that said pendulum can swing freely; (g) means for suspending said multiplicity of chimes to said underneath surface of said widened disc-shaped section of said transverse portion of said suspending frame such that said multiplicity of chimes can swing freely, where said multiplicity of chimes are closely positioned symmetrically around and parallel to said pendulum; (h) a timepiece having a front display surface and a rear surface; and (i) means for attaching said rear surface of said timepiece to said forward end portion of said suspending frame; (j) whereby upon the occurrence of an earthquake, said multiplicity of chimes will swing and collide with said pendulum for providing an auditory alarm to signal the earthquake, including small warning shocks and aftershocks, said pendulum will swing which indicates the direction of the epicenter of the earthquake, and said timepiece will provide information on the exact time of the earthquake.

Defined broadly, the present invention is a multi-function earthquake alerting apparatus, comprising: (a) a suspending frame having a vertical portion for attachment with an interior wall of one's house, a transverse portion and a forward end portion; (b) means for mounting said vertical portion of said suspending frame onto said interior wall; (c) a pendulum suspended to and under said transverse portion of said suspending frame such that the pendulum can swing freely; (d) a multiplicity of identical chimes each having weight and dimensions less than the weight and dimensions of said pendulum and suspended from and under said transverse portion of said suspending frame such that they can swing freely, where the multiplicity of chimes are closely positioned symmetrically around said pendulum so that when they swing they will collide with said pendulum; and (e) a timepiece attached to said forward end portion of said suspending frame; (f) whereby upon the occurrence of an earthquake, said multiplicity of chimes will swing and collide with said pendulum for providing an auditory alarm to signal the earthquake, including small warning shocks and aftershocks, said pendulum will swing which indicates the direction of the epicenter of the earthquake, and said timepiece will provide information on the exact time of the earthquake.

Defined more broadly, the present invention is a multi-function earthquake alerting apparatus, comprising: (a) a suspending frame having a rear portion for attachment to an elevated position in one's home, a transverse portion and a forward end portion; (b) a pendulum suspended to and under said transverse portion of said suspending frame such that the pendulum can swing freely; (c) a multiplicity of chimes each having weight and dimensions different than the weight and dimensions of said pendulum and suspended to and under said transverse portion of said suspending frame such that they can swing freely, where the multiplicity of chimes are closely positioned around said pendulum so that when they swing they will collide with said pendulum; and (d) a timepiece attached to said forward end portion of said suspending frame; (e) whereby upon the occurrence of an earthquake, said multiplicity of chimes will swing and collide with said pendulum for providing an auditory alarm to signal the earthquake, including small warning shocks and after shocks, said pendulum will swing which indicates the direction of the epicenter of the earthquake, and said timepiece will provide information on the exact time of the earthquake.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the present invention might be embodied or operated.

The persent invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A multi-function earthquake alerting apparatus, comprising:

a) a suspending frame made of metal material having a vertical portion for attachment with an interior wall of one's house, a transverse portion having a forward end and a rearward end which is integrally connected to the vertical portion, and a forward end portion integrally connected to the forward end of the transverse portion;

b) means for mounting said vertical portion of said suspending frame to an elevated position on said interior wall;

c) a hollow cylindrical shaped pendulum made of metal material;

d) a multiplicity of identical hollow cylindrical shaped chimes also made of metal material, the weight and dimensions of each chime being substantially less than the weight and dimensions of said pendulum;

e) said transverse portion of said suspending frame further comprising a widened disc-shaped section between its said forward and rearward ends which has an underneath surface for suspending said pendulum and said chimes;

f) means for suspending said pendulum to the center of said underneath surface of said widened disc-shaped section of said transverse portion of said suspending frame such that said pendulum can swing freely;

g) means for suspending said multiplicity of chimes to said underneath surface of said widened disc-shaped section of said transverse portion of said suspending frame such that said multiplicity of chimes can swing freely, where said multiplicity of chimes are closely positioned symmetrically around and parallel to said pendulum;

h) a timepiece having a front display surface and a rear surface; and i) means for attaching said rear surface of said timepiece to said forward end portion of said suspending frame;

j) whereby upon the occurrence of an earthquake, said multiplicity of chimes will swing and collide with said pendulum for providing an auditory alarm to signal the earthquake, including small warning shocks and aftershocks, said pendulum will swing which indicates the direction of the epicenter of the earthquake, and said timepiece will provide information on the exact time of the earthquake.

2. The invention as defined in claim 1 wherein said means for mounting said vertical portion of said suspending frame to an elevated position on said interior wall includes a multiplicity of screws, and a multiplicity of small apertures on said vertical portion of said suspending frame for accommodating the multiplicity of screws respectively.

3. The invention as defined in claim 1 wherein said multiplicity of identical hollow cylindrical shaped chimes are four identical hollow cylindrical shaped chimes that are symmetrically suspended around said pendulum and respectively positioned in four 90 degrees apart locations with equal gaps therebetween.

4. The invention as defined in claim 3 wherein each respective gap between adjacent parallel chimes is narrower than the outer cross-sectional diameter of said cylindrical pendulum to ensure that when said pendulum swings it will definitely collide with at least one of said multiplicity of chimes.

5. The invention as defined in claim 1 wherein said means for suspending said pendulum to the center of said underneath surface of said widened disc-shaped section of said transverse portion of said suspending frame includes a hook-and-thread combination, which includes a hook attached to said underneath surface of said widened disc-shaped section of said transverse portion of said suspending frame, and at least one thread hanging on said hook and attaching an upper end of said cylindrical shaped pendulum.

6. The invention as defined in claim 1 wherein said means for suspending said multiplicity of chimes to said underneath surface of said widened disc-shaped section of said transverse portion of said suspending frame includes a multiplicity of hook-and-thread combination, each of which includes a hook attached to said underneath surface of said widened disc-shaped section of said transverse portion of said suspending frame, and at least one thread hanging on said hook and attaching an upper end of a respective one of said multiplicity of cylindrical shaped chimes.

7. The invention as defined in claim 1 wherein said means for attaching said rear surface of said timepiece to said forward end portion of said suspending frame includes at least one screw bolt, at least one small aperture on said forward end portion of said suspending frame for accommodating said at least one screw bolt, and at least one screw bore on said rear surface of said timepiece for receiving said at least one screw bolt.

8. The invention as defined in claim 1 wherein said widened disc-shaped section of said transverse portion of said suspending frame is a separate piece attached to said transverse portion of said suspending frame.

9. The invention as defined in claim 1 wherein said timepiece is a clock which can operate independent of a normal household electric power source.

10. A multi-function earthquake alerting apparatus, comprising:
a) a suspending frame having a vertical portion for attachment with an interior wall of one's house, a transverse portion and a forward end portion;
b) means for mounting said vertical portion of said suspending frame onto said interior wall;
c) a pendulum suspended to and under said transverse portion of said suspending frame such that the pendulum can swing freely;
d) a multiplicity of identical chimes each having weight and dimensions less than the weight and dimensions of said pendulum and suspended from and under said transverse portion of said suspending frame such that they can swing freely, where the multiplicity of chimes are closely positioned symmetrically around said pendulum so that when they swing they will collide with said pendulum; and
e) a timepiece attached to said forward end portion of said suspending frame;
f) whereby upon the occurrence of an earthquake, said multiplicity of chimes will swing and collide with said pendulum for providing an auditory alarm to signal the earthquake, including small warning shocks and after shocks, said pendulum will swing which indicates the direction of the epicenter of the earthquake, and said timepiece will provide information on the exact time of the earthquake.

11. The invention as defined in claim 10 wherein said means for mounting said vertical portion of said suspending frame onto said interior wall includes screw bolt members.

12. The invention as defined in claim 10 wherein said pendulum is hollow cylindrical shaped.

13. The invention as defined in claim 10 wherein said multiplicity of chimes are identical and hollow cylindrical shaped, and are symmetrically suspended around said pendulum and respectively positioned in equally spaced apart relationships.

14. The invention as defined in claim 10 wherein said pendulum and said multiplicity of chimes are suspended to said transverse portion of said suspending frame by respective hook-and-thread means.

15. The invention as defined in claim 10 wherein said timepiece is attached to said forward end portion of said suspending frame by screw bolt means.

16. The invention as defined in claim 10 wherein said timepiece is a clock which can operate independent of a normal household electric power source.

17. A multi-function earthquake alerting apparatus, comprising:
a) a suspending frame having a rear portion for attachment to an elevated position in one's home, a transverse portion and a forward end portion;
b) a pendulum suspended to and under said transverse portion of said suspending frame such that the pendulum can swing freely;
c) a multiplicity of chimes each having weight and dimensions different than the weight and dimensions of said pendulum and suspended to and under said transverse portion of said suspending frame such that they can swing freely, where the multiplicity of chimes are closely positioned around said pendulum so that when they swing they will collide with said pendulum; and
d) a timepiece attached to said forward end portion of said suspending frame;
e) whereby upon the occurrence of an earthquake, said multiplicity of chimes will swing and collide with said pendulum for providing an auditory alarm to signal the earthquake, including small warning shocks and after shocks, said pendulum will swing which indicates the direction of the epicenter of the earthquake, and said timepiece will provide information on the exact time of the earthquake.

18. The invention as defined in claim 17 wherein said rear portion of said suspending frame has a straight vertical section which is mounted to an interior wall of one's home.

19. The invention as defined in claim 17 wherein said rear portion of said suspending frame has an angled section which is mounted to an interior ceiling of one's home.

20. The invention as defined in claim 17 wherein said pendulum has a hollow cylindrical shaped configuration.

21. The invention as defined in claim 17 wherein said multiplicity of chimes have an identical hollow cylindrical shaped configuration and are suspended around said pendulum in closely spaced apart relationships.

22. The invention as defined in claim 17 wherein said pendulum and said multiplicity of chimes are suspended from said transverse portion of said suspending frame by respective hook-and-thread means.

23. The invention as defined in claim 17 wherein said timepiece is attached to said forward end portion of said suspending frame by screw bolt means.

24. The invention as defined in claim 17 wherein said timepiece is a battery operated clock.

* * * * *